Figure 1:
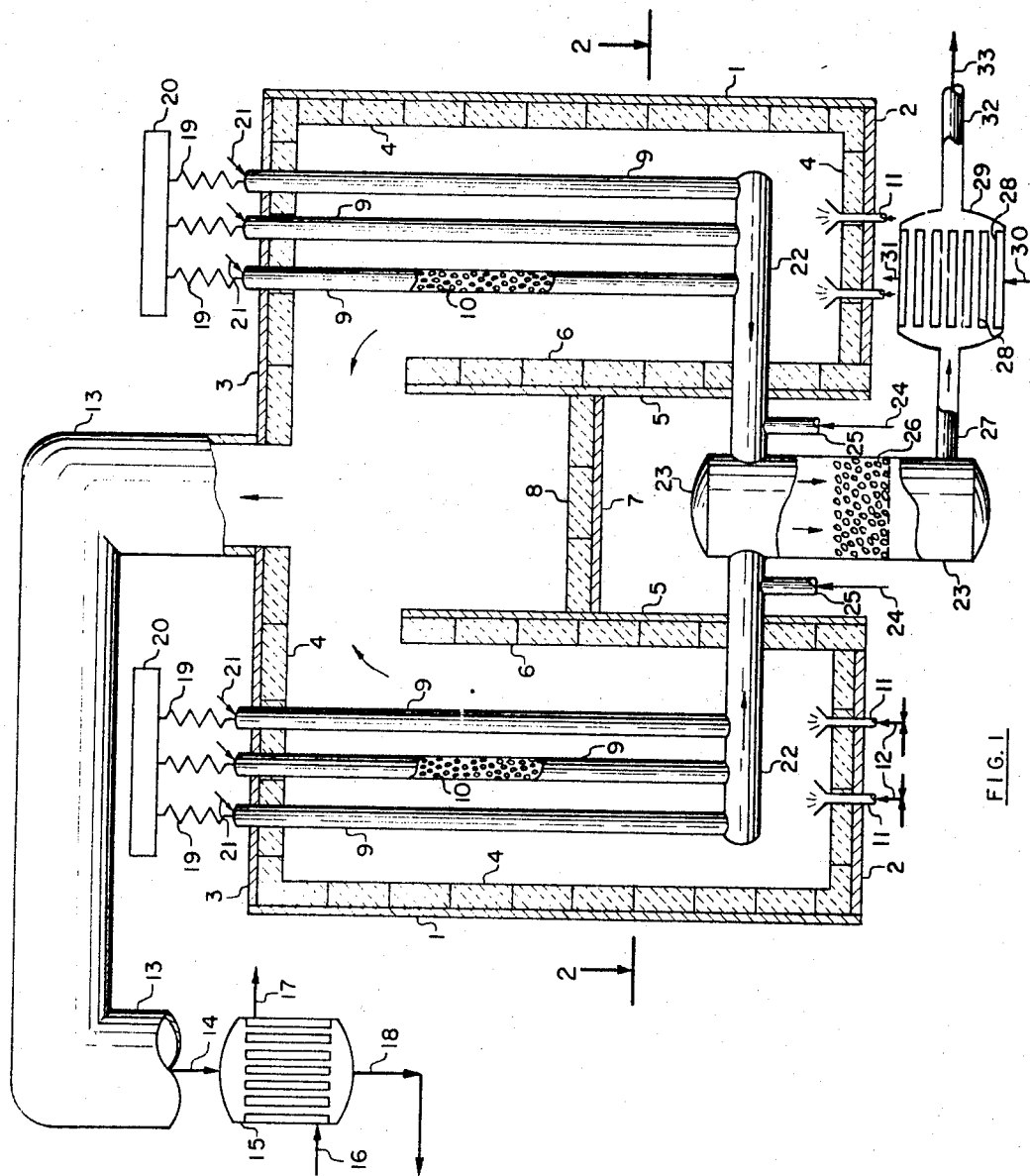

PAUL KORWIN
INVENTOR
BY
AGENT

United States Patent Office 3,450,507
Patented June 17, 1969

3,450,507
INTEGRATED REFORMING OF HYDROCARBONS
Paul Korwin, Flushing, N.Y., assignor to Chemical Construction Corporation, New York, N.Y., a corporation of Delaware
Filed Oct. 27, 1966, Ser. No. 589,946
Int. Cl. B01j 9/04
U.S. Cl. 23—288                            11 Claims The present invention relates to the catalytic steam reforming of fluid hydrocarbons such as natural gas to produce crude synthesis gas, and provides an improved integrated apparatus combination for combined primary and secondary reforming.

The catalytic steam reforming of fluid hydrocarbons such as natural gas, which principally consists of methane, is an important commercial process for the production of crude synthesis gas containing hydrogen and carbon monoxide. When the synthesis gas is to be employed in the synthesis of ammonia, the reaction is carried out in two stages, generally designated as primary steam reforming and secondary reforming. The primary reforming stage is carried out by passing a gaseous mixture of fluid hydrocarbon and steam through a plurality of externally heated reformer tubes filled with an active hydrocarbon reforming catalyst such as nickel oxide or cobalt oxide deposited on a suitable carrier such as kaolin or alumina. The hydrocarbon is thus at least partially reacted with steam, to form an intermediate high temperature gas stream containing hydrogen, carbon monoxide, unreacted hydrocarbon and steam, and in most cases a minor proportion of carbon dioxide. This intermediate high temperature gas stream, which is usually at a highly elevated temperature of 750° F. to 1000° C. or higher, is then removed from the primary reformer container, and passed by means of complex piping assemblages, such as the transfer piping arrangement described in U.S. patent application No. 493,646 filed Oct. 7, 1965, now U.S. Patent No. 3,355,362, to a separate secondary reforming vessel. In the secondary reforming vessel, process air is added or injected into the hot gas stream so as to cause further temperature elevation by exothermic reaction and to add the requisite nitrogen for ammonia synthesis gas, and the combined gas stream is passed through a bed of active hydrocarbon reforming catalyst for further steam reforming and the production of a crude synthesis gas principally containing hydrogen, nitrogen and carbon monoxide. The catalytic steam reforming of fluid hydrocarbons is further described in U.S. Patents Nos. 1,931,442; 2,537,708; 2,813,779; 2,894,826 and Reissue No. 24,311.

In the present invention, primary steam reforming and secondary reforming are combined into an integrated apparatus, in which primary reforming is carried out in a plurality of tubes vertically oriented in radial linear banks or rows disposed in an annular space within a vertically oriented cylindrical container and external to a central cylindrical partition which is coaxial with the container. The secondary reformer vessel is centrally disposed within the partition, and the partially reformed gas mixture is transferred from the tubes to the vessel by means of substantially horizontal linear transfer ducts, each of which is disposed below one of the tube banks and extends radially inwards through the partition to a connection with the secondary reformer vessel above the bed of active hydrocarbon reforming catalyst.

The principal advantage of the present invention is that an integrated reforming apparatus combination is provided, which eliminates the complex and expensive prior art assemblages for transfer of the hot gas stream from the primary reformer to the secondary reformer, such as the apparatus described in U.S. patent application cited supra. Another advantage of the invention is that the integrated apparatus combination is more compact and requires less plant area than the arrangements of the prior art, in which the primary reformer and secondary reformer are separate units which are spaced apart within the facility.

It is an object of the present invention to provide an improved apparatus for the catalytic reforming of fluid hydrocarbons.

Another object is to provide an integrated apparatus for combined primary and secondary reforming of fluid hydrocarbons.

A further object is to provide an apparatus for combined primary and secondary reforming of fluid hydrocarbons which does not require complex and expensive apparatus for transfer of hot process gas from the primary reformer to the secondary reformer.

An additional object is to provide a unitary apparatus combination for primary and secondary reforming, in which the secondary reformer is centrally disposed within an annular primary reformer.

Still another object is to provide an apparatus for combined primary and secondary reforming in which the hot intermediate process gas mixture is transferred from primary reforming to seconday reforming in an improved manner.

These and other objects and advantages of the present invention will become evident from the description which follows. Referring to the figures, FIGURE 1 is a sectional elevation view of the apparatus of the invention, and FIGURE 2 is a plan view of FIGURE 1, taken on section 2—2.

Figure 2:
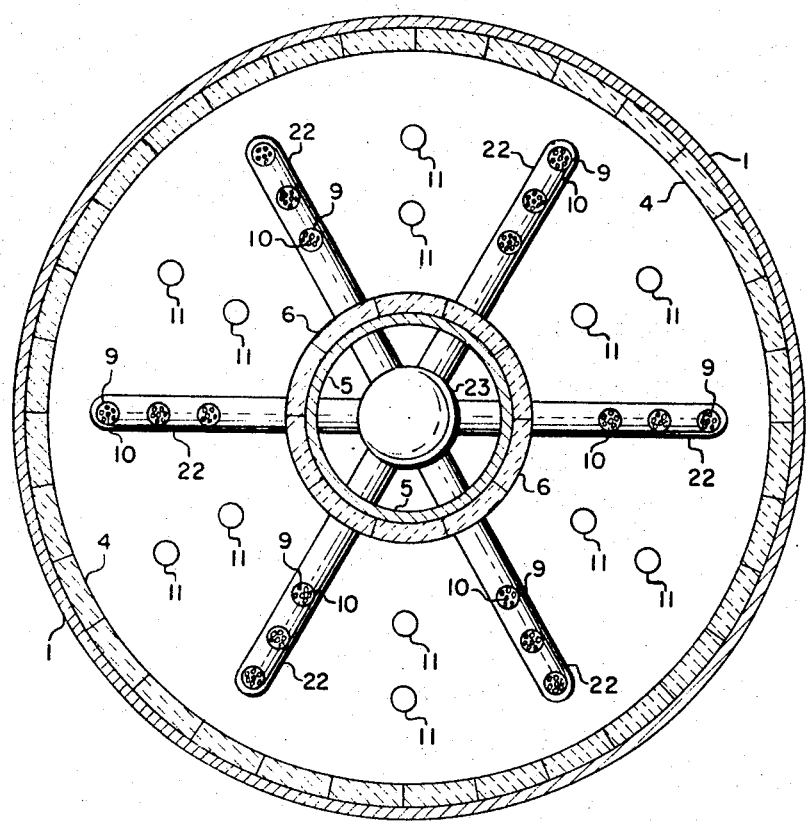

Referring now to FIGURE 1, the primary reforming reaction is carried out within the vertically oriented cylindrical container 1, which is provided with a base or floor 2 and an upper roof 3. A refractory lining 4 is usually provided on the inner surface of sections 1, 2 and 3 in order to protect these sections from the highly elevated internal reformer furnace temperature. A vertical cylindrical partition 5 is centrally and coaxially disposed within container 1, and extends upwards from a circular opening in the base 2. The partition 5 is usually provided with an outer refractory lining 6, which is similar in function to lining 4 described supra. An additional horizontal circular partition 7 is disposed within partition 5, so as to provide a closure against flue gas flow. The partition 7 will usually be provided with an upper refractory lining 8. A fluid hydrocarbon burner, not shown, may be mounted in partition 7 and directed upwards, to provide auxiliary flue gas flow and improve air circulation in the space above the secondary reformer. In such instances, the inner surface of partition 5 above partition 7 will consist of a refractory wall, not shown.

A plurality of primary reformer tubes 9 are vertically disposed in radial linear rows within the annular space between partition 5 and container wall 11. The tubes 9 are provided with an inner bed or packing 10 consisting of particles of active hydrocarbon reform catalyst, which usually consists of an active substance such as nickel oxide, cobalt oxide, zirconia, chromia or molybdenum oxide, or mixtures of these substances, deposited on a suitable carrier such as kaolin or alumina. The tubes 9 are externally heated by any suitable means, such as combustion of a fluid hydrocarbon or the provision of electric resistor heating elements. In this preferred embodiment of the invention, tubes 9 are heated by the provision of a plurality of fluid hydrocarbon burners 11 disposed in the base 2 of the primary reformer, with streams of fluid hydrocarbon and air being passed via 12 to units 11 and reacted in a combustion reaction above the lower refractory lining 4, so as to generate an elevated temperature flue gas and heat the tubes 9. Any suitable fluid hydrocarbon, such as natural gas, crude oil, Bunker C residual oil or naphtha may be employed in burners 11. Additional fluid hydrocarbon burners, not shown, may be disposed in the wall 1 and roof 3 of the primary reformer, so as to produce uniform heating of the tubes 9. The flame generated by the burners 11 will usually heat the refractory lining 4 to incandescence, and generate a radiant heating effect with temperatures of 750° C. to 1000° C. or higher. The hot flue gas generated by burners 11 will transmit heat to the tubes 9 by radiation and convection currents and then rise externally to the tubes 9 in the annular space between container wall 1 and partition 5, and then flows through an upper central opening in roof 3 into flue gas transfer duct 13. The flue gas stream 14 is discharged by duct 13 into convection heat exchanger 15, and serves to heat a process fluid, superheat steam, or heat any other stream which is admitted into unit 15 via stream 16 and discharged as warmed or vaporized fluid via stream 17. The partially cooled flue gas stream 18 is now usually further cooled in a flue gas waste heat boiler, not shown, which vaporizes feed water to generate usable process steam. The final cooled flue gas is then discharged to atmosphere through a stack, not shown. Other suitable means for recovery of heat from the flue gas, such as employment of the flue gas as a direct contact evaporative medium, or to preheat water or air, will occur to those skilled in the art. An auxiliary fluid hydrocarbon burner, not shown, may be suitably disposed in duct 13, in instances where high temperature level heat exchange is desired in unit 15.

The primary reformer tubes 9 may be mounted and vertically disposed within the annular primary reformer section of container 1 by the provision of any suitable tube mounting means. The tubes 9 will preferably be mounted by suspending these tubes from upper individual spring supports 19, which are suspended from upper support beams 20 and serve to maintain at least a portion of the tubes 9 in tension when the tubes are heated to elevated temperature. As an alternative, the tube suspension systems described in U.S. Patent No. 3,172,739, or U.S. patent application No. 466,984 filed June 25, 1965, now U.S. Patent No. 3,419,362, may be provided in practice.

A gaseous feed mixture, divided into streams 21 and consisting of a fluid hydrocarbon mixed with steam is passed into the upper ends of tubes 9 for catalytic primary steam reforming. The fluid hydrocarbon will usually consist of a gaseous hydrocarbon stream principally containing methane however a vaporized normally liquid hydrocarbon such as naphtha or other hydrocarbon feed stock such as propane or butane may be employed in the feed mixture. The gaseous feed mixture of fluid hydrocarbon and steam flows downwards through tubes 9, and is heated to highly elevated temperature while in contact with catalyst particles 10, so that a primary steam reforming reaction is carried out with conversion of a portion of the hydrocarbon to synthesis gas by catalytic reaction with steam. The tubes 9 are connected at their lower ends to the substantially horizontal linear transfer ducts 22. The partially reformed gas mixture flows from the lower ends of tubes 9 into the ducts 22, and thence horizontally inwards through the linear ducts 22, which extend radially inwards through the partition 5 and terminate at connections with the upper end of the vertically oriented cylindrical secondary reformer vessel 23, which is coaxially disposed within the partition 5 and extends downwards below the base 2 of the primary reformer container. The gas mixture is thus discharged from the ducts 22 into the upper end of vessel 23.

Process streams 24, consisting of process air which may be enriched with added oxygen, are added via pipes 25 to the gaseous stream within ducts 22, and an exothermic combustion reaction takes place between the gaseous streams in the upper part of vessel 23, with the resultant further elimination of unreacted hydrocarbon and temperature elevation. In addition, the requisite nitrogen for ammonia synthesis gas is also added to the process gas mixture. The hot gas mixture now flows downwards within vessel 23 and through catalyst bed 26, which consists of active hydrocarbon reforming catalyst and is usually similar to catalyst particles 10 described supra. Final catalytic reforming of residual hydrocarbon takes place at highly elevated temperature within bed 26, and the resultant fully reformed crude synthesis gas, now principally containing hydrogen, nitrogen and carbon monoxide, is removed from vessel 23 below bed 26 via duct 27. The crude synthesis gas is at a highly elevated temperature and must be cooled prior to further processing including catalytic carbon monoxide reaction with steam by the water gas shift reaction, and removal of carbon dioxide by conventional means such as scrubbing with potassium carbonate or monoethanolamine solution. The crude synthesis gas in duct 27 is cooled by passing through the tubes 28 of the reformed gas waste heat boiler 29, with feed water being passed into unit 29 via stream 30 and usable process steam being removed via stream 31. The cooled crude synthesis gas is passed from unit 29 to further processing as described supra via duct 32 as stream 33.

Referring now to FIGURE 2, a sectional plan view of FIGURE 1 taken on section 2—2 is shown, which illustrates the concentric coaxial arrangement of the several apparatus elements 1, 5 and 23, and also illustrates the linear radial arrangement of the substantially horizontal transfer ducts 22.

Numerous alternatives within the scope of the present invention, besides those mentioned supra, will occur to those skilled in the art. The refractory lining 4 may be omitted in some instances, depending on the type of tube heating facility which is provided and the material of construction of elements 1, 2 and 3. The secondary reformer vessel 23 may be provided with a partial or total internal refractory lining in some instances. Partition 5 may terminate adjacent to partition 7 in some cases, however, it will usually be desirable to extend partition 5 and refractory lining 6 upwards to a terminus adjacent to roof 3 so as to divert hot flue gas adjacent to the tubes 9 throughout their entire length. The pipes 25 may alternatively extend directly into the top of unit 23 in some instances, and may discharge process air horizontally or tangential into vessel 23.

I claim:

1. An apparatus for the reforming of fluid hydrocarbons to produce a crude synthesis gas principally containing hydrogen, nitrogen and carbon monoxide which comprises a vertically oriented cylindrical container, a vertical cylindrical partition, said partition being coaxially disposed within said container and extending upwards from an opening in the base of said container, a plurality of primary hydrocarbon reformer tubes, said tubes being vertically aligned in the annular space between said partition and said container in linear rows of tubes, each of said rows of tubes being radially disposed with respect to the central vertical axis of said container, each of said tubes containing an active hydrocarbon reforming catalyst, means within said container to externally heat said tubes to elevated temperature, means to pass a gaseous feed mixture comprising a fluid hydrocarbon and steam downwards through said tubes, whereby said fluid hydrocarbon is at least partially catalytically steam reformed, a vertically oriented cylindrical secondary reformer vessel, said vessel being coaxially disposed within said cylindrical partition and extending downwards below the base of said container, said vessel being provided with an internal bed of active hydrocarbon reforming catalyst, a plurality of substantially horizontal linear transfer ducts, each of said ducts being disposed below one of said rows of tubes and connected with the tubes in said row, whereby a partially reformed gas mixture flows from said tubes into said ducts, each of said ducts extending in a linear horizontal direction and radially inwards through said partition to a connection with said vessel above said catalyst bed, whereby the partially reformed gas mixture is discharged into said vessel above said catalyst bed, means to pass process air into said vessel above said catalyst bed, whereby said process air reacts with said partially reformed gas mixture within said vessel and above said catalyst bed, and means to remove a crude synthesis gas principally containing hydrogen, nitrogen and carbon monoxide from said vessel below said catalyst bed.

2. The apparatus of claim 1, in which said means to heat said tubes within said container comprises a plurality of fluid hydrocarbon burners disposed in the base of said container and external to said partition, together with means to pass a fluid hydrocarbon and air to said burners whereby said fluid hydrocarbon is burned to generate an elevated temperature and produce a hot flue gas, and means to remove said flue gas from the upper portion of said container.

3. The apparatus of claim 1, in which said active hydrocarbon reforming catalyst within said tubes and said vessel comprises an active substance selected from the group consisting of nickel oxide, cobalt oxide, zirconia, chromia, molybdenum oxide and their mixtures, said active substance being deposited on a suitable carrier.

4. The apparatus of claim 1, in which said container is provided with an internal refractory lining.

5. The apparatus of claim 1, in which said process air is passed into said vessel by adding said process air to said partially reformed gas mixture within said linear transfer ducts.

6. The apparatus of claim 1, in which said tubes are suspended and depend vertically downwards from upper spring supports, whereby said tubes are at least partially maintained in tension when heated to elevated temperature and during passage of said gaseous feed mixture through said tubes.

7. The apparatus of claim 1, in which said process air comprises oxygen-enriched air.

8. The apparatus of claim 1, in which said fluid hydrocarbons consist of a gaseous stream principally containing methane.

9. An apparatus for the reforming of a gaseous hydrocarbon stream principally containing methane, to produce a crude synthesis gas principally containing hydrogen, nitrogen and carbon monoxide, which comprises a vertically oriented cylindrical container, said container being provided with an inner refractory lining, a vertical cylindrical partition, said partition being coaxially disposed within said container and extending upwards from an opening in the base of said container, a plurality of primary hydrocarbon reformer tubes, said tubes being vertically suspended from upper spring supports in the annular space between said partition and said container, whereby said tubes are at least partially maintained in tension during elevated temperature service, said tubes being aligned in linear rows of tubes, each of said rows of tubes being radially disposed with respect to the central vertical axis of said container, each of said tubes containing an active hydrocarbon reforming catalyst comprising an active substance selected from the group consisting of nickel oxide, cobalt oxide, zirconia, chromia, molybdenum oxide and their mixtures, said active substance being deposited on a suitable carrier, a plurality of fluid hydrocarbon burners, said burners being disposed in the base of said container and external to said partition, means to pass a fluid hydrocarbon and air to said burners, whereby said fluid hydrocarbon is burned to externally heat said tubes to elevated temperature and produce a hot flue gas, means to remove said flue gas from the upper portion of said container, means to pass a gaseous feed mixture comprising said gaseous hydrocarbon stream mixed with steam downwards through said tubes, whereby said gaseous hydrocarbon stream is at least partially catalytically steam reformed, a vertically oriented cylindrical secondary reformer vessel, said vessel being coaxially disposed within said cylindrical partition and extending downwards below the base of said container, said vessel being provided with an internal bed of active hydrocarbon reforming catalyst comprising an active substance selected from the group consisting of nickel oxide, cobalt oxide, zirconia, chromia, molybdenum oxide and their mixtures, said active substance being deposited on a suitable carrier, a plurality of substantially horizontal linear transfer ducts, each of said ducts being disposed below one of said rows of tubes and connected with the tubes in said row, whereby a partially reformed gas mixture flows from said tubes into said ducts, each of said ducts extending in a linear horizontal direction and radially inwards through said partition to a connection with said vessel above said catalyst bed, whereby the partially reformed gas mixture is discharged into said vessel above said catalyst bed, means to pass process air into said vessel above said catalyst bed, whereby said process air reacts with said partially reformed gas mixture within said vessel and above said catalyst bed, and means to remove a crude synthesis gas principally containing hydrogen, nitrogen and carbon monoxide from said vessel below said catalyst bed.

10. The apparatus of claim 9, in which said process air is passed into said vessel by adding said process air to said partially reformed gas mixture within said linear transfer ducts.

11. The apparatus of claim 9, in which said process air comprises oxygen-enriched air.

References Cited

UNITED STATES PATENTS

| | | | |
|---|---|---|---|
| 24,311 | 5/1957 | Mader | 48—196 |
| 1,931,442 | 10/1933 | Klempt | 252—376 |
| 1,942,956 | 1/1934 | De Grey | 48—107 |
| 1,957,535 | 5/1934 | Harris | 48—94 |
| 2,537,708 | 1/1951 | Scharmann | 23—212 |
| 2,813,779 | 11/1957 | Faatz | 23—212 |
| 2,894,826 | 7/1959 | Stengel | 23—212 |
| 3,172,739 | 3/1965 | Koniewiez | 23—289 |
| 3,257,172 | 6/1966 | Kao et al. | 48—94 |

MORRIS O. WOLK, *Primary Examiner.*

J. D. OLSEN, *Assistant Examiner.*

U.S. Cl. X.R.

23—212, 282; 48—75, 94, 105